United States Patent
De Souza et al.

(10) Patent No.: US 10,122,004 B2
(45) Date of Patent: Nov. 6, 2018

(54) QUICK CONNECT ASSEMBLY FOR BUSBARS IN AN ELECTRIFIED VEHICLE

(71) Applicant: FORD GLOBAL TECHNOLOGIES, LLC, Dearborn, MI (US)

(72) Inventors: Urban J. De Souza, Rochester Hills, MI (US); Stephenson Tyler Mattmuller, Detroit, MI (US); Michael Barr, Canton, MI (US); Nondo G. Basoukeas, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/461,056

(22) Filed: Mar. 16, 2017

(65) Prior Publication Data
US 2018/0269454 A1    Sep. 20, 2018

(51) Int. Cl.
*H01M 2/24* (2006.01)
*H01M 2/20* (2006.01)
*B60L 11/18* (2006.01)
*H01R 13/627* (2006.01)
*H01R 25/16* (2006.01)

(52) U.S. Cl.
CPC ......... *H01M 2/206* (2013.01); *B60L 11/1879* (2013.01); *H01R 13/627* (2013.01); *H01R 25/162* (2013.01); *H01M 2220/20* (2013.01)

(58) Field of Classification Search
CPC ....................... H01M 2/206; H01M 2220/20
See application file for complete search history.

(56) References Cited

U.S. PATENT DOCUMENTS

| | | |
|---|---|---|
| 4,555,159 A | 11/1985 | Chartrain et al. |
| 6,629,863 B2 | 10/2003 | Kieninger et al. |
| 6,805,593 B2 | 10/2004 | Spaulding et al. |
| 7,344,421 B1 | 3/2008 | Spencer |
| 7,611,798 B2 | 11/2009 | Yoon et al. |
| 9,457,743 B2 | 10/2016 | Soleski et al. |
| 2001/0051450 A1 | 12/2001 | Ross |
| 2011/0117420 A1 | 5/2011 | Kim et al. |
| 2011/0229754 A1* | 9/2011 | Zhao ................. H01M 10/0413 429/158 |
| 2015/0110155 A1 | 4/2015 | Turgeon et al. |

FOREIGN PATENT DOCUMENTS

| | | |
|---|---|---|
| JP | 2015028939 | 2/2015 |
| WO | 2015034595 | 3/2015 |
| WO | 2015035023 | 3/2015 |

* cited by examiner

*Primary Examiner* — Jane J Rhee
(74) *Attorney, Agent, or Firm* — Carlson, Gaskey & Olds, P.C.

(57) ABSTRACT

A battery assembly according to a non-limiting aspect of the present disclosure includes, among other things, a busbar, an array of battery cells including an electrical terminal, and a quick connect assembly mechanically and electrically coupling the busbar to the electrical terminal.

11 Claims, 5 Drawing Sheets

QUICK CONNECT ASSEMBLY FOR BUSBARS IN AN ELECTRIFIED VEHICLE

BACKGROUND

This disclosure relates to a quick connect assembly for busbars in an electrified vehicle.

The need to reduce automotive fuel consumption and emissions is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by battery powered electric machines. Conventional motor vehicles, by contrast, rely exclusively on an internal combustion engine to propel the vehicle.

Electrified vehicles include a number of components that are electrically coupled by way of busbars. Busbars carry relatively high electrical currents between components of the electrified vehicle. Such components include battery packs, electric machines, generators, converters, etc. Typically, these components are coupled to busbars by way of a threaded connection including a nut and bolt.

SUMMARY

A battery assembly according to a non-limiting aspect of the present disclosure includes, among other things, a busbar, an array of battery cells including an electrical terminal, and a quick connect assembly mechanically and electrically coupling the busbar to the electrical terminal.

In a further non-limiting embodiment of the foregoing battery assembly, the quick connect assembly includes a first quick connect fitting on the busbar and a second quick connect fitting on the electrical terminal.

In a further non-limiting embodiment of any of the foregoing battery assemblies, the first quick connect fitting and the second quick connect fitting are push fittings configured to couple the busbar to the electrical terminal by a push force and without a threaded connection.

In a further non-limiting embodiment of any of the foregoing battery assemblies, the first quick connect fitting is an end of the busbar, and the second quick connect fitting includes a socket receiving the end of the busbar.

In a further non-limiting embodiment of any of the foregoing battery assemblies, the socket includes a plurality of leaves. Further, upon application of the push force, the end of the busbar urges the leaves away from one another such that the end of the busbar can be received in the socket. Further still, when the end of the busbar is in the socket, the leaves maintain the end of the busbar within the socket.

In a further non-limiting embodiment of any of the foregoing battery assemblies, the end of the busbar is one of spherical-shaped and ovular-shaped, and wherein the shape of the socket corresponds to the shape of the end of the busbar.

In a further non-limiting embodiment of any of the foregoing battery assemblies, the first quick connect fitting includes a projection, and wherein the second quick connect fitting includes a cantilevered arm configured to engage the projection to provide a snap-fit.

In a further non-limiting embodiment of any of the foregoing battery assemblies, the busbar includes a plurality of layers, and wherein each layer includes a tapered end, the tapered ends mating with corresponding tapered cavities in the electrical terminal to electrically couple the busbar to the electrical terminal.

In a further non-limiting embodiment of any of the foregoing battery assemblies, the projection is spaced-apart from the tapered ends.

In a further non-limiting embodiment of any of the foregoing battery assemblies, the busbar includes two projections on opposed sides of the busbar, and the second quick connect fitting includes two cantilevered arms configured to engage a respective one of the projections.

In a further non-limiting embodiment of any of the foregoing battery assemblies, the quick connect assembly includes a clamp assembly configured to couple the busbar to the electrical terminal by a clamping force and without a threaded connection.

In a further non-limiting embodiment of any of the foregoing battery assemblies, the clamp assembly includes a cam lever configured to clamp relative to an end of the busbar.

In a further non-limiting embodiment of any of the foregoing battery assemblies, the cam lever is rotatable about a pin connected to the electrical terminal, the electrical terminal includes jaws moveable relative to one another, the jaws configured to clamp against the end of the busbar, and rotation of the cam lever causes movement of the jaws.

An electrified vehicle according to a non-limiting aspect of the present disclosure includes, among other things, a busbar, an electrical terminal, and a quick connect assembly configured to mechanically and electrically couple the busbar to the electrical terminal upon application of one of a (1) push force and a (2) clamping force, and without a threaded connection.

In a further non-limiting embodiment of the foregoing electrified vehicle, the electrical terminal is associated with one of an array of battery cells, a generator, an electric motor, and a converter.

A method according to a non-limiting aspect of the present disclosure includes, among other things, mechanically and electrically coupling a busbar to an electrical terminal using a quick connect fitting.

In a further non-limiting embodiment of the foregoing method, the busbar is coupled to the electrical terminal by imparting a push force on the busbar.

In a further non-limiting embodiment of any of the foregoing methods, an end of the busbar is received in a socket of the electrical terminal.

In a further non-limiting embodiment of any of the foregoing methods, an end of the busbar is snap-fit relative to the electrical terminal.

In a further non-limiting embodiment of any of the foregoing methods, the busbar is coupled to the electrical terminal by imparting a clamping force on the busbar.

DETAILED DESCRIPTION

This disclosure relates to a quick connect assembly that electrically couples a busbar to a component of an electrified vehicle. Such components include battery assemblies, motors, generators, or converters, as examples. The quick connect assembly provides a durable and easy-to-establish connection. These and other features are discussed in greater detail in the following paragraphs of this detailed description.

Figure 1:
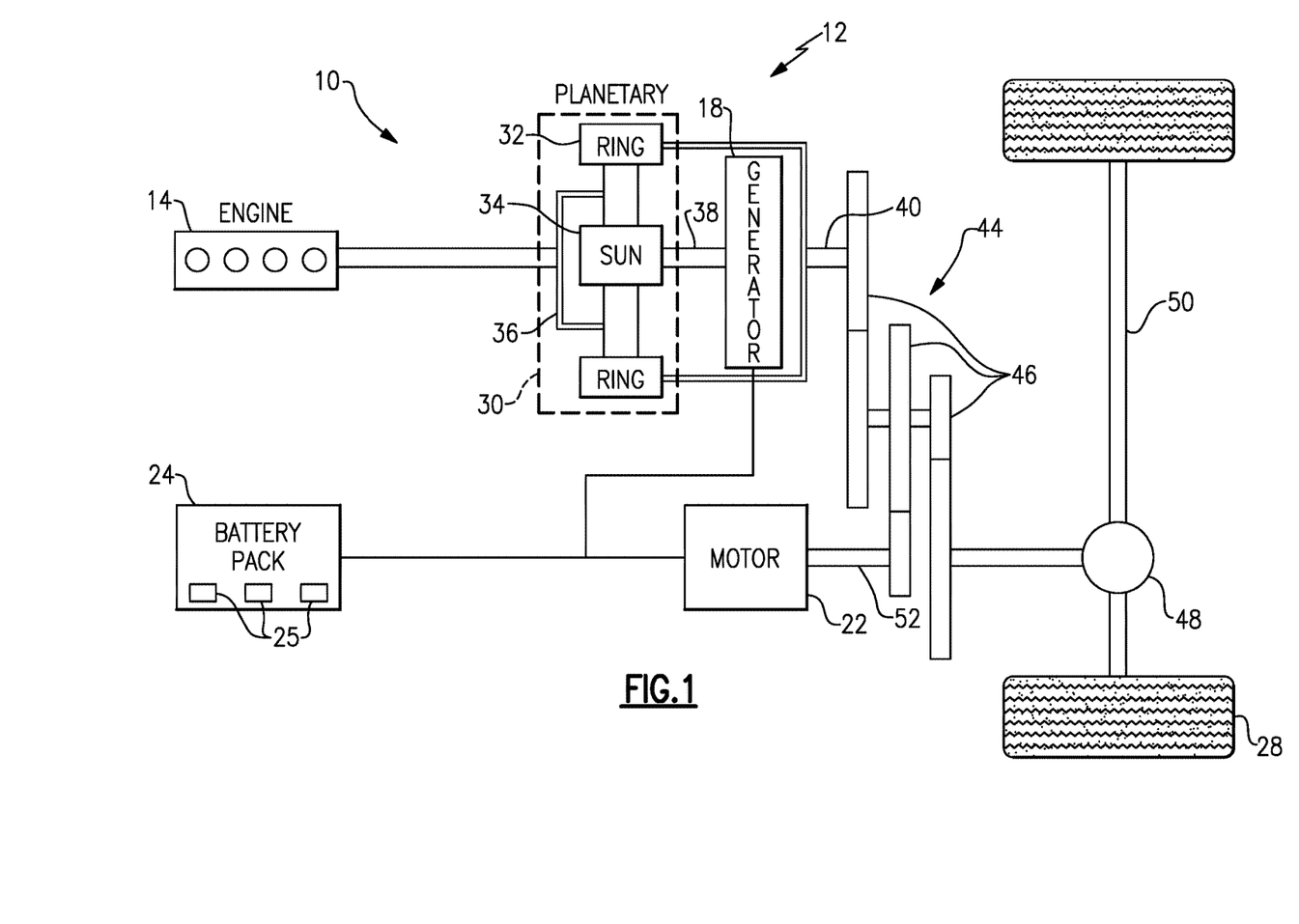
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's) and battery electric vehicles (BEV's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an exemplary electrified vehicle battery. The battery assembly 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
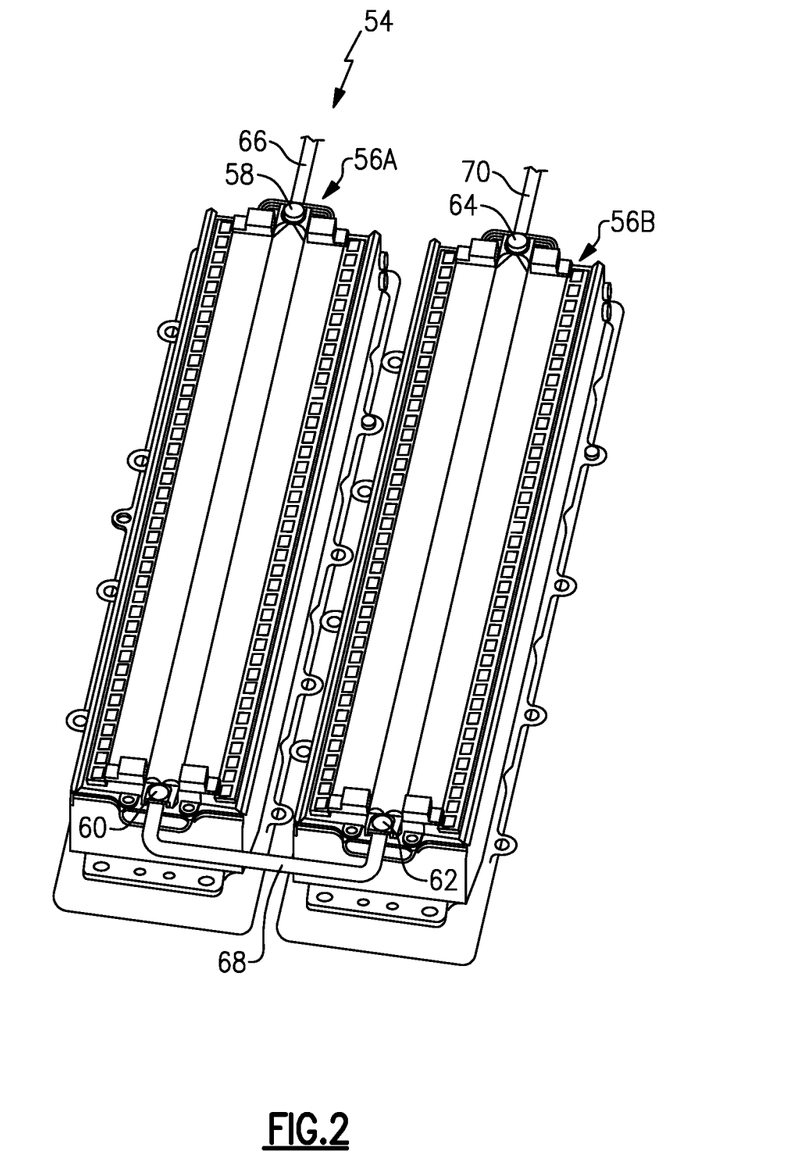
FIG. 2 schematically illustrates an example battery assembly of an electrified vehicle.

FIG. 2 illustrates a battery assembly 54 that can be incorporated into an electrified vehicle. For example, the battery assembly 54 could be employed within the electrified vehicle 12 of FIG. 1. The battery assembly 54 includes battery arrays, which can be described as groupings of battery cells, for supplying electrical power to various vehicle components. In this example there are two battery arrays 56A, 56B. Although two battery arrays 56A, 56B are illustrated in FIG. 2, the battery assembly 54 could include a single battery array or multiple battery arrays. In other words, this disclosure is not limited to the specific configuration shown in FIG. 2.

Each battery array 56A, 56B includes a plurality of battery cells that may be stacked side-by-side along a span length of each battery array 56A, 56B. In one embodiment, the battery cells are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

The battery arrays 56A, 56B in this example include first and second electrical terminals configured to electrically couple to a busbar. The busbar electrically couples the terminals, and in turn the arrays 56A, 56B, to other components with in the electrified vehicle. In this example, the battery array 56A includes first and second terminals 58, 60 at opposite ends of the battery array 56A. The battery array 56B likewise includes first and second electrical terminals 62, 64 at opposite ends of the battery array 56B.

In the example of FIG. 2, the first terminal 58 of the battery array 56A is electrically coupled to a first busbar 66. In one example, the first busbar 66 is electrically coupled another battery array at one end, and the first terminal 58 at the other end. Continuing with the example of FIG. 2, a second busbar 68 electrically couples the second terminal 60 of the battery array 56A to the first terminal 62 of the battery array 56B. The second terminal 64 of the battery array 56B is electrically coupled to another component of the electrified vehicle 12, such as the generator 18 or motor 22, by way of another busbar 70. In this way, the busbars 66, 68, 70 are configured to electrically couple the various components of the electrified vehicle 12 together.

The busbars 66, 68, 70 are high amperage busbars in one example. That is, the busbars 66, 68, 70 are configured to carry currents of at least 5 Amps, and in one example the busbars 66, 68, 70 are configured to carry currents in excess of 50 Amps. Thus, the busbars 66, 68, 70 are suitable for electrically coupling the various components of the electrified vehicle 12.

FIGS. 3A-6B illustrate various embodiments of a quick connect assembly configured to mechanically and electrically couple the busbars (e.g., 66, 68, 70) to the terminals (e.g., 58, 60, 62, 64). As used in this disclosure, the term quick connect or quick connect assembly refers to any connection that does not require tools. For example, the term quick connect or quick connect assembly is not inclusive of threaded or flanged connections which are established using nuts and wrenches.

The disclosed quick connect assemblies increase the ease of assembly of the electronic components of the electrified vehicle. Further, the disclosed quick connect assemblies provide a durable and reliable connection, and thus do not compromise the integrity of connection relative to a traditional threaded connection, for example. In each of the disclosed example quick connect assemblies, the assemblies include a first quick connect fitting on the busbar and a second, corresponding quick connect fitting on the terminal.

Figure 3A:
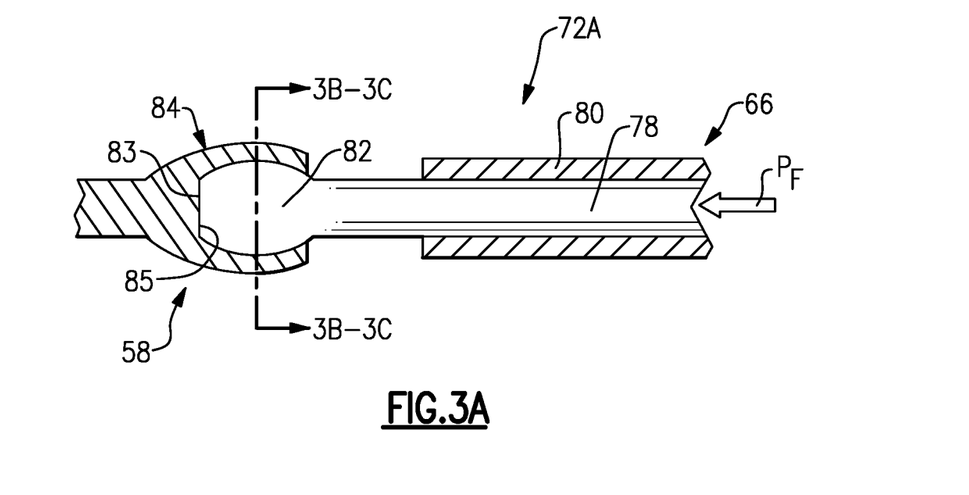
FIG. 3A is a side view of a first example quick connect assembly, which is a ball-and-socket type of quick connect assembly.

FIG. 3A is a side view illustrating a first example quick connect assembly 72A between the busbar 66 and the terminal 58, for example. It should be understood that this quick connect assembly 72A could be used to connect a busbar to any electronic component in the electrified vehicle 12, however, and is not limited to use between the terminal 58 and the busbar 66. In this example, the quick connect assembly 72A of FIG. 3A includes first and second quick connect fittings that provide a ball-and-socket type of connection. Further, the first and second quick connect fittings are push fittings configured to electrically couple the busbar to the terminal by a push force $P_F$ and without a threaded connection.

In this example, the busbar 66 includes a conductive portion 78, such as a copper cable, surrounded by insulation 80 over much of its length. Adjacent the terminal 58, an end 82 of the busbar 66 provides a first quick connect fitting. In this example, the end 82 of the busbar 66 includes a rounded outer contour. Further, the tip 83 of the end 82 is substantially flat in this example.

Figure 3B:
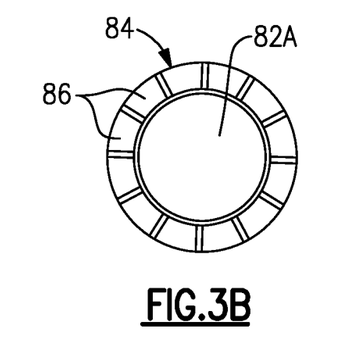
FIG. 3B is a view taken along line 3B-3C-3B-3C in FIG. 3A, and illustrates a first ball-and-socket arrangement.
Figure 3C:
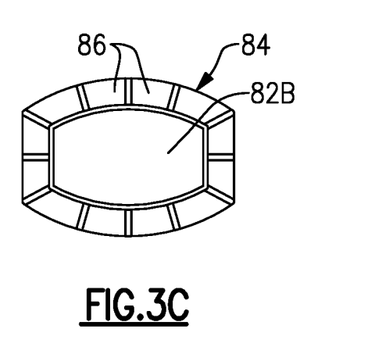
FIG. 3C is a view taken along line 3B-3C-3B-3C in FIG. 3A, and illustrates a second ball-and-socket arrangement.

The terminal 58 includes a socket 84 configured to receive the end 82 of the busbar 66 upon application of the push force $P_F$ to the busbar 66. In this example, the end 82 and the socket 84 are made of conductive material, such as copper, and thus contact between the two electrically couples the terminal 58 to the busbar 66. The socket 84 includes a plurality of leaves 86, as shown in FIGS. 3B-3C. The leaves 86 are curved projections extending from the terminal 58. The leaves 86 are arranged such that, upon application of the push force $P_F$, the end 82 of the busbar 66 urges the leaves 86 away from one another and allow the end 82 to be received in the socket 84. When the end 82 of the busbar 66 is in the socket 84, the leaves 84 are biased back toward one another and maintain the position of the end 82 within the socket 84. Further, in this example, the tip 83 of the end 82 is in direct contact with a corresponding flat surface 85 at a base of the socket 84 to ensure a reliable electrical connection.

The socket 84 in this example is shaped to correspond to the outer contour of the end 82. In one particular example, the end 82A is substantially spherical, as illustrated in FIG. 3B, and in another example the end 82B is ovular-shaped with flat sides, as illustrated in FIG. 3C. It should be understood that the shapes of FIGS. 3B and 3C are exemplary and that other arrangements come within the scope of this disclosure.

Figure 4:
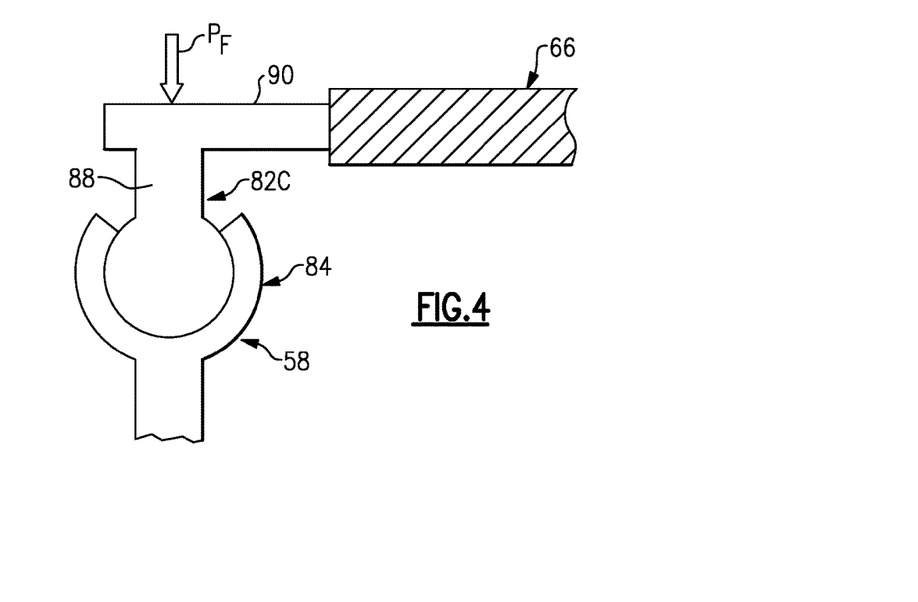
FIG. 4 illustrates an alternate arrangement of a busbar used in a ball-and-socket type of quick connect assembly.

FIG. 4 illustrates an alternate arrangement of the end of the busbar 66. In FIG. 4, the busbar 66 includes an end 82C which is received in a socket 84 of the terminal in substantially the same way as described above, although the end 82C is provided by an arm 88 projecting in a direction normal to the remainder of the busbar 66. In this way, the push force $P_F$ can be applied against an exterior surface 90 of the busbar opposite the terminal 58. The exterior surface 90 is substantially flat in some examples. Further, as shown in FIG. 4, the end 82C is entirely spherical, and does not include a flat tip as in the previous example.

Figure 5:
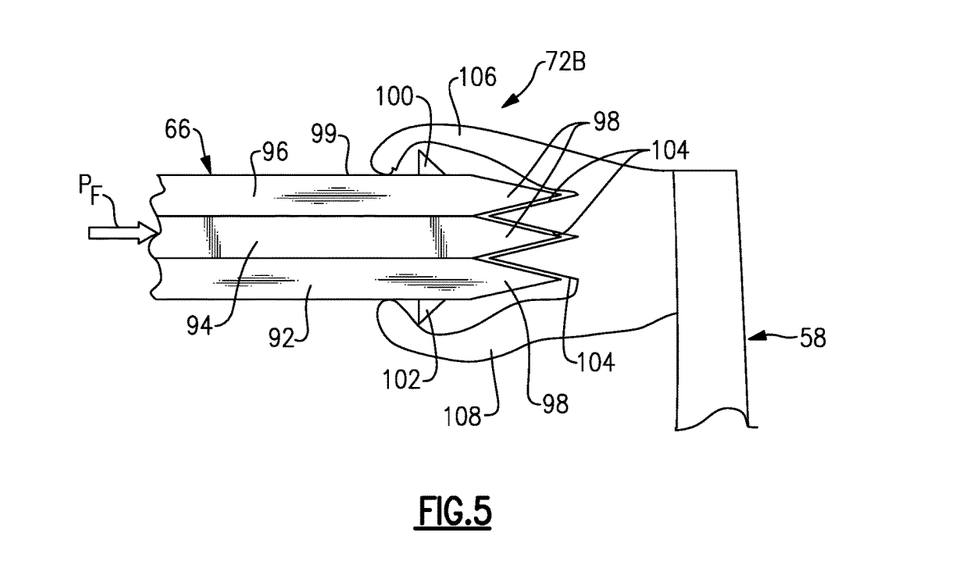
FIG. 5 is a side view of a second example quick connect assembly, which is a snap-fit type of quick connect assembly.

FIG. 5 illustrates another example quick connect assembly 72B. Like the embodiment of FIGS. 3A-4, the quick connect assembly 72B includes first and second quick connect fittings, which are push fittings configured to electrically couple a busbar to a terminal by a push force $P_F$ and without a threaded connection. The quick connect assembly 72B is a snap-fit connection.

For ease of reference, the quick connect assembly 72B is again provided between the terminal 58 and the busbar 66, although it should be understood that the quick connect assembly 72B could be used to electrically couple other components.

In this example, the busbar 66 includes a plurality of layers 92, 94, 96 of conductive material, such as copper, and each layer includes a tapered end 98. At an exterior surface 99 thereof, the busbar 66 includes first and second ramped projections 100, 102 spaced-apart rearward from the tapered ends 98. The ramped projections 100, 102 have a forward face inclined away from the tapered ends 98 of the busbar 66, and a rearward face substantially perpendicular to the exterior surface 99 of the busbar 66.

The terminal 58 in this example includes a plurality of tapered cavities 104 made of a conductive material such as copper, and shaped to correspond to the shape of the tapered ends 98 of the layers 92, 94, 96. By providing tapered ends 98 and corresponding tapered cavities 104, the surface area providing the electrical connection between the terminal 58 and busbar 66 is increased.

In this example, the terminal 58 includes two cantilevered arms 106, 108 configured to engage the projections 100, 102, respectively, to provide a snap-fit between the busbar 66 and the terminal 58. Upon application of a push force $P_F$ to the busbar 66, the projections 100, 102 engage respective cantilevered arms 106, 108 and urge them away from one another. As the push force $P_F$ continues to be applied, the projections 100, 102 pass beyond the ends of the cantilevered arms 106, 108, and the cantilevered arms 106, 108 are biased back toward one another. The bias of the cantilevered arms 106, 108 maintains the position of the busbar 66 such that the tapered ends 98 directly contact the tapered cavities 104.

While two projections 100, 102 and two cantilevered arms 106, 108 are illustrated in FIG. 5, it should be understood that in another embodiment the busbar 66 includes only one projection and the terminal 58 includes only one cantilevered arm.

Figure 6A:
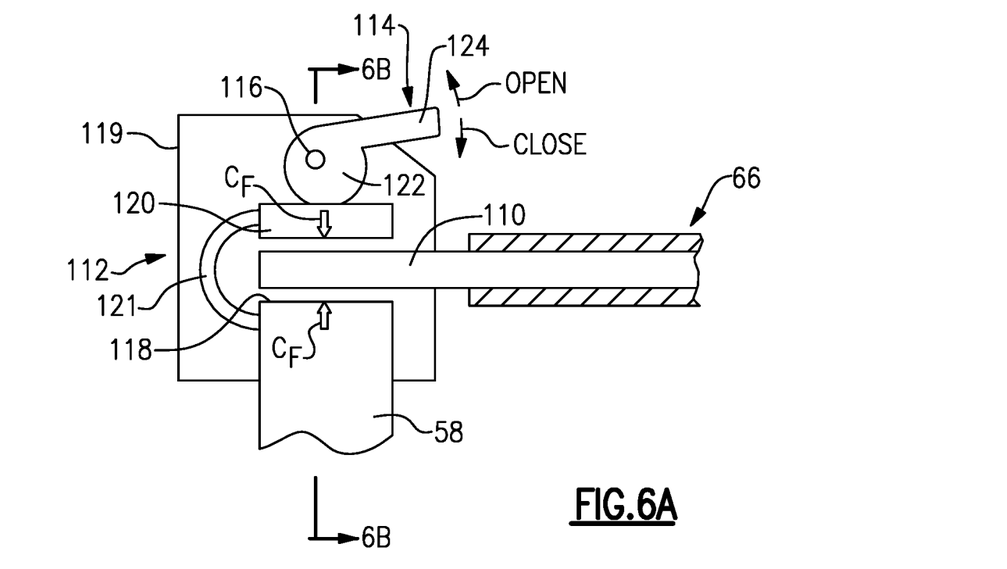
FIG. 6A is a side view of a third example quick connect assembly, which includes a clamp assembly.
Figure 6B:
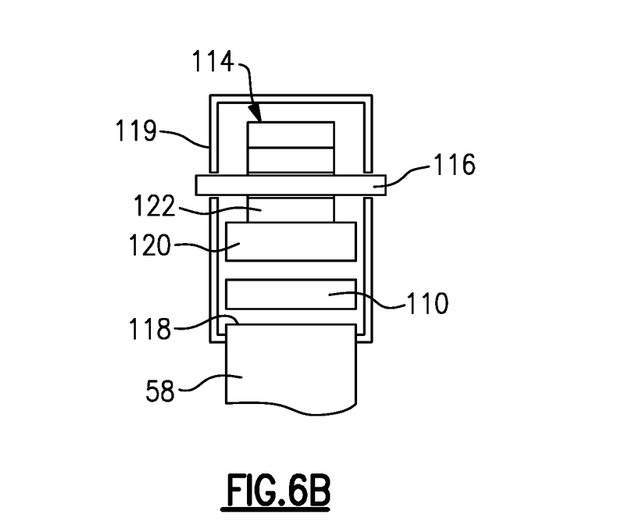
FIG. 6B is a view taken along line 6B-6B in FIG. 6A, and illustrates the detail of the third example quick connect assembly.

While the previously-discussed embodiments describe quick connect assemblies that are connectable under a push force, FIGS. 6A-6B illustrate another type of quick connect assembly 72C that is configured to electrically couple a busbar to a terminal by a clamping force and without a threaded connection. Like with the prior examples, the quick connect assembly 72C is illustrated relative to the terminal 58 and the busbar 66 for ease of reference only.

With joint reference to FIGS. 6A and 6B, the quick connect assembly 72C includes first and second quick connect fittings. The first quick connect fitting is provided by an end 110 of the busbar 66. The second quick connect fitting is provided by a clamping assembly 112 of the terminal 58. The clamping assembly 112 includes a cam lever 114 rotatable about a pin 116 in "open" and "close" directions (labeled in FIG. 6A) to selectively move first and second jaws 118, 120 relative to one another. The jaws 118, 120 are configured to clamp against the end 110 of the busbar 66. The pin 116, and in turn the cam lever 114, are rotationally supported by a housing 119 connected to the terminal 58.

In this example, the first jaw 118 is stationary and the second jaw 120 is moveable relative to the first jaw 118. The first and second jaws 118, 120 are made of a conductive material, such as copper, in this example. In another example, only the first jaw is made of conductive material. Further, in this example, the first jaw 118 is connected to the second jaw 120 by a spring 121. The spring 121 urges the first and second jaws 118, 120 away from one another, such that the first and second jaws 118, 120 can receive an end of a busbar.

The cam lever 114 includes an eccentric cam portion 122 and a lever arm 124. In this example, the lever arm 124 projects from the housing 119 such that it is accessible to a user. The cam portion 122 is arranged such that rotation of the lever arm 124 in the "close" direction moves the second jaw 120 toward the first jaw 118, overcoming the bias of the spring 121, and such that the first and second jaws 118, 120 impart a clamping force $C_F$ on the end 110 of the busbar 66. As such, the busbar 66 is electrically coupled to the terminal 58. The lever arm 124 may be held in place when the clamping force $C_F$ is applied using a known locking mechanism.

The example quick connect assemblies discussed above provide reliable and easy-to-assemble mechanical and electrical connections. The quick connect assemblies are not threaded connections, and do not require tools for assembly. Rather, the operator can make the necessary connections by imparting a relatively small amount of force. Thus, the quick connect assemblies reduce the assembly time for the electrified vehicle 12.

It should be understood that terms such as "substantially" and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery assembly, comprising:
    a busbar having an end;
    an array of battery cells including an electrical terminal having a socket with a plurality of leaves; and
    a quick connect assembly mechanically and electrically coupling the busbar to the electrical terminal, wherein, upon application of a push force, the end of the busbar urges the leaves away from one another such that the end of the busbar can be received in the socket.

2. The battery assembly as recited in claim 1, wherein the quick connect assembly includes a first quick connect fitting on the busbar and a second quick connect fitting on the electrical terminal.

3. The battery assembly as recited in claim 2, wherein the first quick connect fitting and the second quick connect fitting are push fittings configured to couple the busbar to the electrical terminal by a push force and without a threaded connection.

4. The battery assembly as recited in claim 1,
    wherein, when the end of the busbar is in the socket, the leaves maintain the end of the busbar within the socket.

5. The battery assembly as recited in claim 4, wherein the end of the busbar is one of spherical-shaped and ovular-shaped, and wherein the shape of the socket corresponds to the shape of the end of the busbar.

6. An electrified vehicle, comprising:
    a busbar;
    an array of battery cells including an electrical terminal;
    a quick connect assembly including a first quick connect fitting on the busbar and a second quick connect fitting on the electrical terminal, wherein the first quick connect fitting and the second quick connect fitting are push fittings and are configured to mechanically and electrically couple a first end of the busbar to the electrical terminal upon application of a push force and without a threaded connection, wherein the busbar is electrically coupled to another component other than the array of battery cells at a second end;
    wherein the busbar includes a plurality of layers, and wherein each layer includes a tapered end, the tapered ends mating with corresponding tapered cavities in the electrical terminal to electrically couple the busbar to the electrical terminal; and
    wherein the busbar includes two projections on opposed sides of the busbar, and the second quick connect fitting includes two cantilevered arms configured to engage a respective one of the projections to provide a snap-fit.

7. The electrified vehicle as recited in claim 6, wherein the second end of the busbar is electrically coupled to one of another array of battery cells, a generator, an electric motor, and a converter.

8. A method, comprising:
mechanically and electrically coupling a busbar to an electrical terminal using a quick connect fitting, wherein an array of battery cells includes the electrical terminal, and wherein the busbar is electrically coupled to the electrical terminal at one end and to another component other than the array of battery cells at another end, wherein the busbar is coupled to the electrical terminal by applying a push force on the busbar such that an end of the busbar is received in a socket of the electrical terminal, and wherein, upon application of the push force, the end of the busbar urges leaves of the socket away from one another such that the end of the busbar is received in the socket.

9. The electrified vehicle as recited in claim 6, wherein the projections are spaced-apart from the tapered ends.

10. An electrified vehicle, comprising:
a busbar;
an array of battery cells including an electrical terminal;
a quick connect assembly including a clamp assembly and configured to mechanically and electrically couple a first end of the busbar to the electrical terminal upon application of a clamping force and without a threaded connection, wherein the busbar is electrically coupled to another component other than the array of battery cells at a second end;
wherein the clamp assembly includes a cam lever configured to clamp relative to the first end of the busbar.

11. The electrified vehicle as recited in claim 10, wherein:
the cam lever is rotatable about a pin connected to the electrical terminal,
the electrical terminal includes jaws moveable relative to one another, the jaws configured to clamp against the end of the busbar, and
rotation of the cam lever causes movement of the jaws.

* * * * *